(12) United States Patent
McCune, Jr.

(10) Patent No.: US 9,420,647 B2
(45) Date of Patent: Aug. 16, 2016

(54) DIMMING AND VOLTAGE PROTECTION METHOD AND APPARATUS FOR SOLID-STATE LIGHTING

(71) Applicant: Earl W. McCune, Jr., Santa Clara, CA (US)

(72) Inventor: Earl W. McCune, Jr., Santa Clara, CA (US)

(*) Notice: Subject to any disclaimer, the term of this patent is extended or adjusted under 35 U.S.C. 154(b) by 0 days.

(21) Appl. No.: 14/628,409

(22) Filed: Feb. 23, 2015

(65) Prior Publication Data

US 2015/0245433 A1 Aug. 27, 2015

Related U.S. Application Data

(60) Provisional application No. 61/944,145, filed on Feb. 25, 2014.

(51) Int. Cl.
*H05B 33/08* (2006.01)

(52) U.S. Cl.
CPC .......... *H05B 33/0815* (2013.01); *H05B 33/089* (2013.01); *H05B 33/0851* (2013.01); *Y02B 20/341* (2013.01); *Y02B 20/347* (2013.01)

(58) Field of Classification Search
CPC .......... H05B 33/0815; H05B 33/0851; H05B 33/089

USPC .................. 315/291, 294, 297, 317, 308, 312
See application file for complete search history.

(56) References Cited

U.S. PATENT DOCUMENTS

2010/0315019 A1* 12/2010 Hoogzaad et al. ............ 315/291
2011/0227503 A1* 9/2011 Yuan et al. .................... 315/294

\* cited by examiner

*Primary Examiner* — Douglas W Owens
*Assistant Examiner* — Jonathan Cooper
(74) *Attorney, Agent, or Firm* — Patent Law Professionals, P.C.; William E. Winters

(57) ABSTRACT

A solid-state lighting system includes a light-emitting device (LED) driver, an LED or plurality of LEDs, a transistor connected in series with the LED or plurality of LEDs, and a current source connected in parallel with the transistor. The LED driver generates a drive signal, which controls the transistor and current flowing through the LED or plurality of LEDs and the transistor. The drive signal is generated in response to a dim control signal, which determines the dim setting of the LED or plurality of LEDs. The current source serves to maintain at least a minimum current through the LED or plurality of LEDs at all times, even when the transistor is turned OFF or is in a high resistance state, thereby preventing large supply voltages from dropping across the transistor and protecting the transistor from undesirably breaking down or being damaged or destroyed.

8 Claims, 5 Drawing Sheets

DIMMING AND VOLTAGE PROTECTION METHOD AND APPARATUS FOR SOLID-STATE LIGHTING

CROSS-REFERENCE TO RELATED APPLICATIONS

This patent application claims the benefit of U.S. Provisional Patent Application No. 61/944,145, filed on Feb. 25, 2014, the disclosure of which is incorporated herein by reference.

FIELD OF THE INVENTION

The present invention relates in general to solid-state lighting (SSL) and in particular to methods and apparatus for dimming and providing voltage protection in SSL systems.

BACKGROUND OF THE INVENTION

In recent years, refinements in manufacturing methods and economies of scale have made solid-state lighting (SSL) a competitive alternative to more conventional lighting technologies, such as incandescent and fluorescent lighting. SSL is a superior lighting technology, primarily because it employs light-emitting diodes (LEDs) as a source of illumination. LEDs are inexpensive to manufacture, durable, and have a significantly longer lifetime compared to the lighting sources used in more conventional lighting technologies.

An LED is a p-n junction diode made of a binary or ternary group III-V semiconducting material, such as gallium phosphide (GaP) or indium gallium nitride (InGaN), for example. When a sufficient forward voltage $V_f$ is applied across the p-n junction, electrons and holes recombine to form photons (i.e., light). This phenomenon, known as "electroluminescence," produces light of a wavelength that is determined by the energy band gap of the particular semiconducting material being used.

In some lighting applications it is necessary or desirable for an SSL system to produce a large amount of light in one circumstance and to be dimmed to a significantly lower level in another circumstance. In a movie theater, for example, it is usually desirable to produce a large amount of light during intermissions, so that adequate lighting is available to assist moviegoers as they enter and exit the theater, and to dim the light to low levels when moviegoers are seated and movies are being presented. Because each LED can produce only a limited amount of light (usually on the order of 100 lumens or less), a plurality of LEDs is often employed in order to produce the large amount of light that is desired at the high end of the lighting range. Typically, the plurality of LEDs are connected in series (i.e., as a "string" of LEDs) or are configured in multiple strings and connected parallel (i.e., in a series-parallel configuration). So that the LEDs are able to conduct and emit light, the power supply voltage required to power each LED string must be greater than the sum of the forward voltage drops $V_f$ across all LEDs in the string. Because the forward voltage $V_f$ across each LED necessary for the LED to conduct and emit appreciable light is typically within the range of 2 to 4 volts, the required power supply voltage can be high when a large number of LEDs are connected in the string.

To dim the light produced by the LED string to the lower end of the lighting range, a dimmer of some kind is used. Typically, the dimmer is an electrical circuit which employs a technique known as pulse width modulation (PWM). PWM is a process in which a PWM control signal comprising a periodic sequence of pulses is used to intermittently interrupt current flowing through the LED string. By controlling (i.e., modulating) the durations (i.e., "widths") of the pulses in the PWM control signal, the fraction of time during each period that the LEDs can conduct and thereby emit light can be controlled. To perform dimming, the durations of the pulses are simply reduced in duration so that the LEDs conduct and emit light less often. On average, the human eye perceives this effect as dimming.

Although PWM is a viable approach to dimming, the high supply voltages that are necessary to power the LED strings can potentially damage electrical components in the SSL system, particularly those components that are connected in series with the LED string. This problem is particularly acute at low dimming levels when the LEDs are not conducting for large fractions of the PWM control periods.

BRIEF SUMMARY OF THE INVENTION

Systems and methods for controlling dimming in solid-state lighting (SSL) are disclosed. An exemplary solid-state lighting (SSL) system includes a light-emitting device (LED) or a plurality of LEDs (e.g., connected in a series string), an LED driver, a transistor or other active device connected in series with the LED or plurality of LEDs, and a current source connected in parallel with the transistor or other active device. The transistor or other active has a control input configured to receive a drive signal from the LED driver. The drive signal may be a pulse-width modulated (PWM) drive signal, which alternately turns the transistor ON or OFF to effect dimming, or may be a variable voltage that varies the resistance of the transistor or other active device in order to control the amount of current flowing through the LED or plurality of LEDs and, accordingly, the amount of light that is emitted by the LED or plurality of LEDs. The current source serves to maintain a minimum current through the LED or plurality of LEDs when the transistor or other active device is turned OFF or presents a high resistance to the flow of current through the LED or plurality of LEDs. In one embodiment of the invention the minimum current that is maintained is set by determining (either by measuring or obtaining from the LED manufacturer I-V characteristic data) what current flows through the LED or plurality of LEDs at a threshold when the LED or plurality of LEDs just stops emitting observable light (e.g., observable to a human eye) or emits light that is just barely observable. By employing the current source, at least the minimum current set by the current source is maintained through the LED or plurality of LEDs at all times. Maintaining the minimum current when the transistor or other active device is turned OFF or presents itself as a high-resistance to current flow through the LED or plurality of LEDs ensures that large supply voltages are not dropped across the transistor or other active device, thereby preventing the transistor or other device from breaking down or being damaged or destroyed.

The SSL methods and apparatus of the present invention may be used in wide variety of lighting applications, including but not limited to, general purpose lighting in homes and offices, street lighting, signage, vehicle and aviation lighting, and backlighting for liquid crystal displays.

Further features and advantages of the invention, including descriptions of the structure and operation of the above-summarized and other exemplary embodiments of the invention, will now be described in detail with respect to accompanying

DETAILED DESCRIPTION

Figure 1:
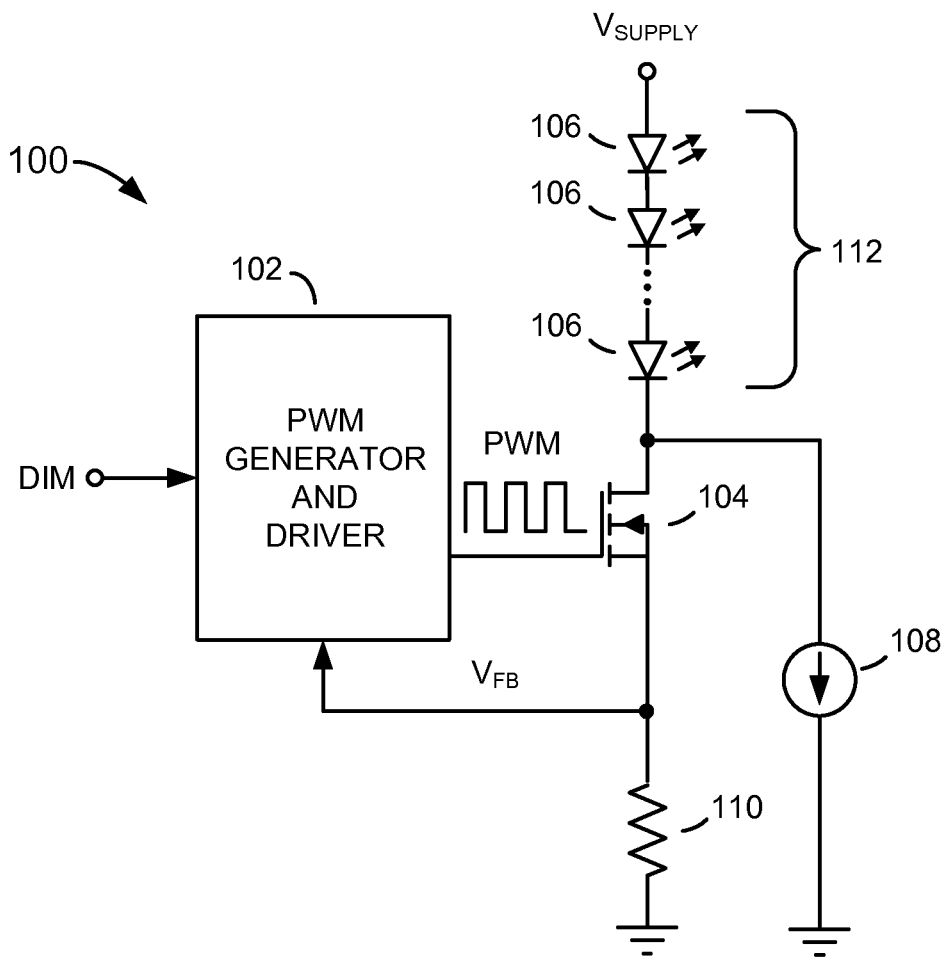
FIG. 1 is a schematic drawing of a solid-state lighting (SSL) system, according to an embodiment of the present invention.

Referring to FIG. 1, there is shown a schematic diagram of a solid-state lighting (SSL) system 100, according to an embodiment of the present invention. The SSL system 100 includes a pulse-width modulation (PWM) generator and driver 102, a metal-oxide-semiconductor field-effect transistor (MOSFET) 104 (or other type of transistor or active device), one or more LEDs 106, a current source 108, and an optional resistor 110. In the drawings and the description that follows, the one or more LEDs 106 is/are depicted as being a series string 112 of LEDs 106. However, as will be appreciated by those of ordinary skill in the art and with their benefit of this disclosure, the various aspects of the present invention are also applicable to when only a single LED 106 is used, when a plurality of LEDs connected in parallel is used, or when a series-parallel combination of LEDs is used.

The SSL system 100 may be implemented using discrete components but is preferably manufactured as one or more integrated circuits (IC). In one exemplary embodiment, for example, the PWM generator and driver 102, MOSFET 104, current source 108, and resistor 110 are all fabricated in a single IC with the MOSFET 104 providing an open drain, to which the LED string 112 can be externally connected.

The LED string 112 is coupled between a power supply $V_{SUPPLY}$ and the drain of the MOSFET 104. The MOSFET 104 is configured so that its drain-to-source current path is in series with the LED string 112 and the optional resistor 110. The gate of the MOSFET 104 is driven by a PWM control signal produced by the PWM generator and driver 102. The PWM control signal comprises a periodic sequence of pulses having durations (i.e., "widths") depending on a dim control signal DIM applied to the PWM generator and driver 102. When a pulse is present at the gate of the MOSFET 104, the MOSFET is turned ON, current flows through the LED string 112, MOSFET 104, and optional resistor 110, and light is emitted by the LEDs 106 of the LED string 112. Conversely, when no pulse is present, the MOSFET 104 is turned OFF. Turning the MOSFET 104 ON and OFF in this manner effectively lowers the average current flowing through the LED string 112, similar to as described above, and this effect is perceived by the human eye as dimming. The PWM generator and driver 102 modulates the widths of the pulses in the PWM control signal according to the setting of the dim control signal DIM, increasing or decreasing the widths of the pulses in cycles of the PWM control signal to set the desired dimming level. So that no or very little light flicker is perceived, the frequency of the PWM control signal is preferably designed and set to be 1 kHz or higher.

The optional resistor 110 may be configured to serve as a current-limiting resistor that limits current flow through the LED string 112 when the MOSFET is turned ON, thereby protecting the LEDs 106 and other components in the current path of the LED string 112 from excessive heat and possible damage. The optional resistor 110 may not be necessary in all applications. If it is not used, the source of the MOSFET 104 can be connected to ground potential or to some other voltage lower than the supply voltage $V_{SUPPLY}$. In one embodiment of the invention the PWM generator and driver 102 includes a current regulator that regulates the current flowing through the LED string 112. According to that embodiment, the optional resistor 110 can be configured to serve as a current-sensing resistor which senses the current flowing through the LED string 112. A feedback voltage $V_{FB}$ representative of the sensed current is fed back to the PWM generator and driver 102, allowing the current regulator in the PWM generator and driver 102 to regulate current flow through the LED string 112.

The current source 108 has a first end that is coupled to a node connecting the LED string 112 to the drain of the MOSFET 104 and a second end that is connected to ground potential (or some other voltage lower than the supply voltage $V_{SUPPLY}$). The current source 108 is in a secondary current path that diverts a small predetermined (i.e., minimum) current away from the primary current path through which current flows through the LED string 112, MOSFET 104, and optional resistor 110. The current source 108 serves to ensure that at least a minimum current (set by the current source) flows through the LED string 112 at all times, even at low dim levels when no or very little observable light is being emitted by the LEDs 106. By maintaining at least the minimum current through the LEDs 106 in the LED string 112, the LEDs 106 remain conducting at all times, even when the MOSFET 104 is turned OFF or presents itself as a high resistance in the primary current path. Large voltage drops from the power supply $V_{SUPPLY}$ are therefore prevented from being dropped across the MOSFET 104 when the MOSFET 104 is turned OFF or presents itself as a high resistance, thereby protecting the MOSFET 104 from breaking down or being damaged or destroyed. Because of the exponential current characteristics of the LEDs 106, all that is needed is a very small current source to shunt the MOSFET 104. In one embodiment of the invention, for example, only a small 50 μA current source is needed.

In one embodiment of the invention the current source 108 is designed so that the current it sources is at a level just slightly below a current threshold at which light emitted by the LEDs 106 in the LED string 112 is not visible (e.g., is not observable to a human eye) or is just barely observable. This "visible threshold" (or "observable threshold") may be dependent upon the type of LEDs 106 being used.

Figure 2:
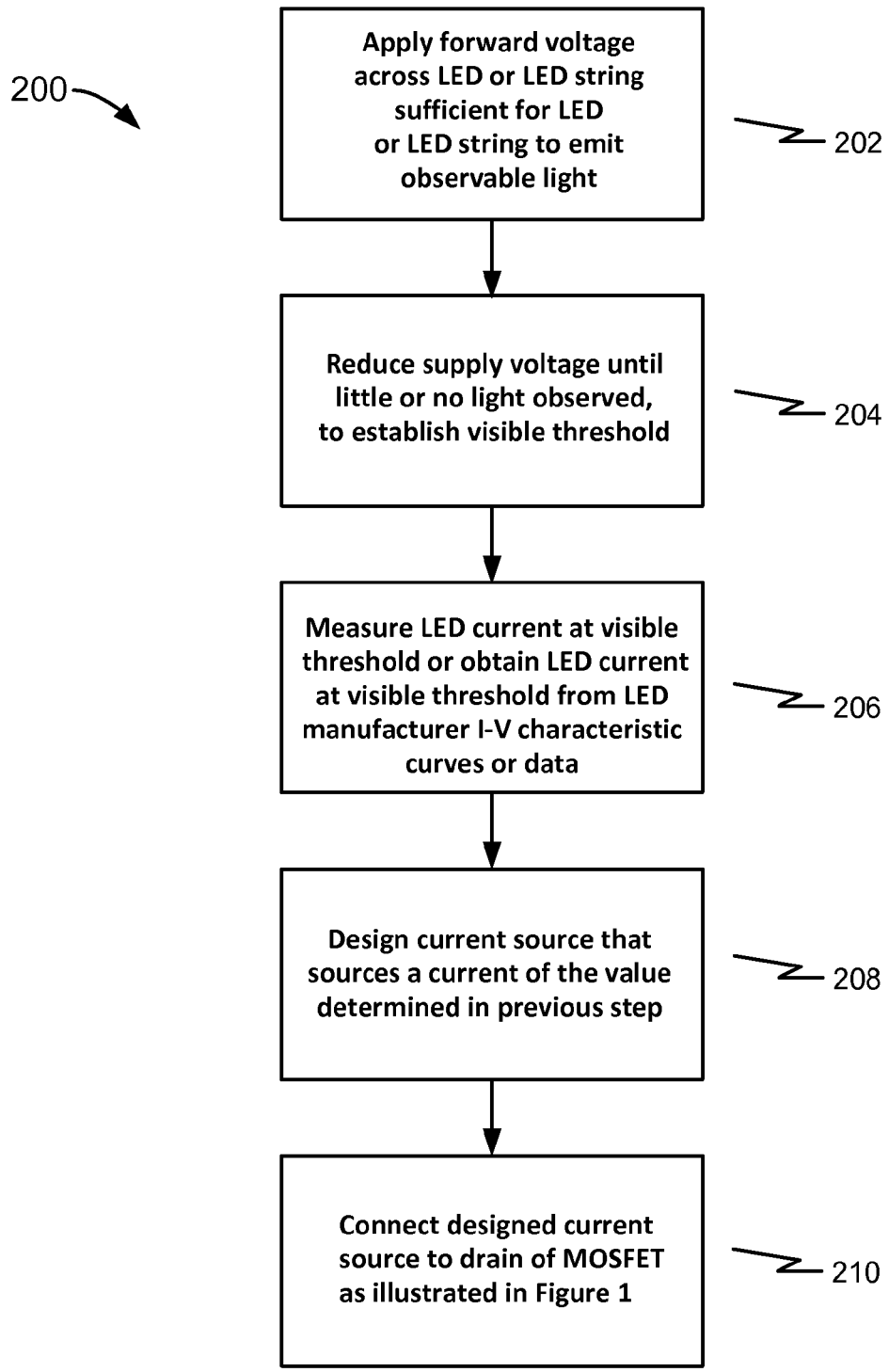
FIG. 2 is a flowchart illustrating a method of maintaining current through a light-emitting diode (LED) or LED string of the SSL system in FIG. 1 at or near a "visible threshold," according to one embodiment of the invention.

FIG. 2 is a flowchart illustrating a method of maintaining the LED current in the SSL system 100 in FIG. 1 at or near the visible threshold, according to one embodiment of the invention. In the first step 202 of the method 200, the LED or LED string 112 is configured in a test setup and a forward voltage is applied across it. The applied forward voltage is made to be sufficient to make the LED or LED string 112 conduct and emit observable light.

Next, in step 204 the forward voltage applied across the LED or LED string 112 is reduced until little or no light emission is observed, thereby establishing the visible threshold of the LED or LED string 112.

Figure 3:
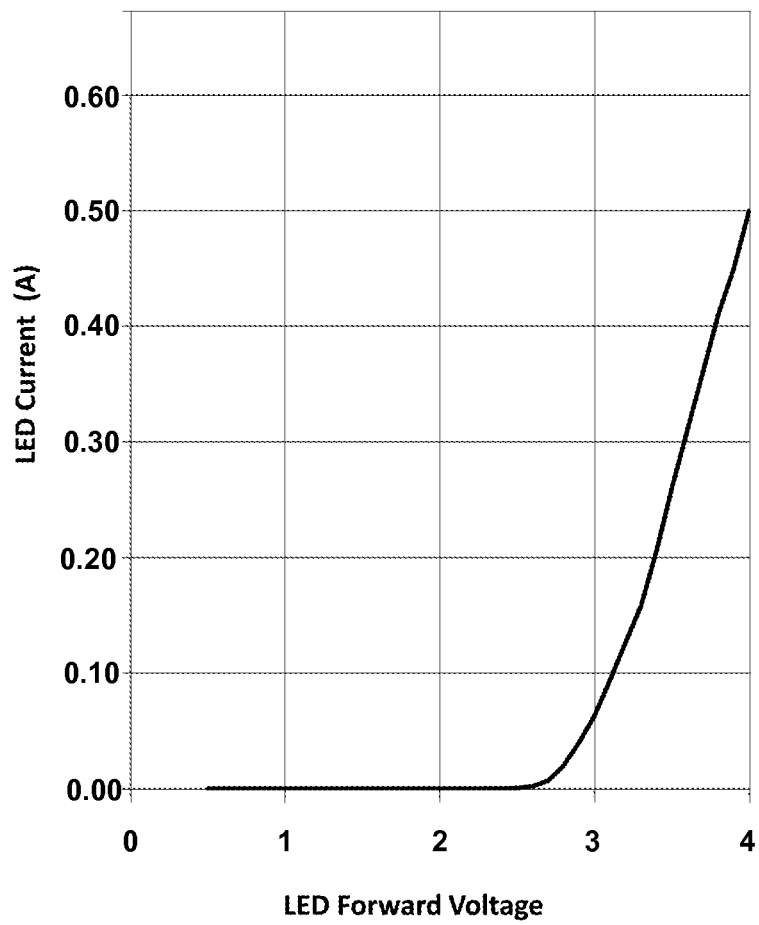
FIG. 3 is a drawing of the current-voltage (I-V) characteristics of a high-brightness LED (HB-LED), which may be used in the SSL system in FIG. 1.
Figure 4:
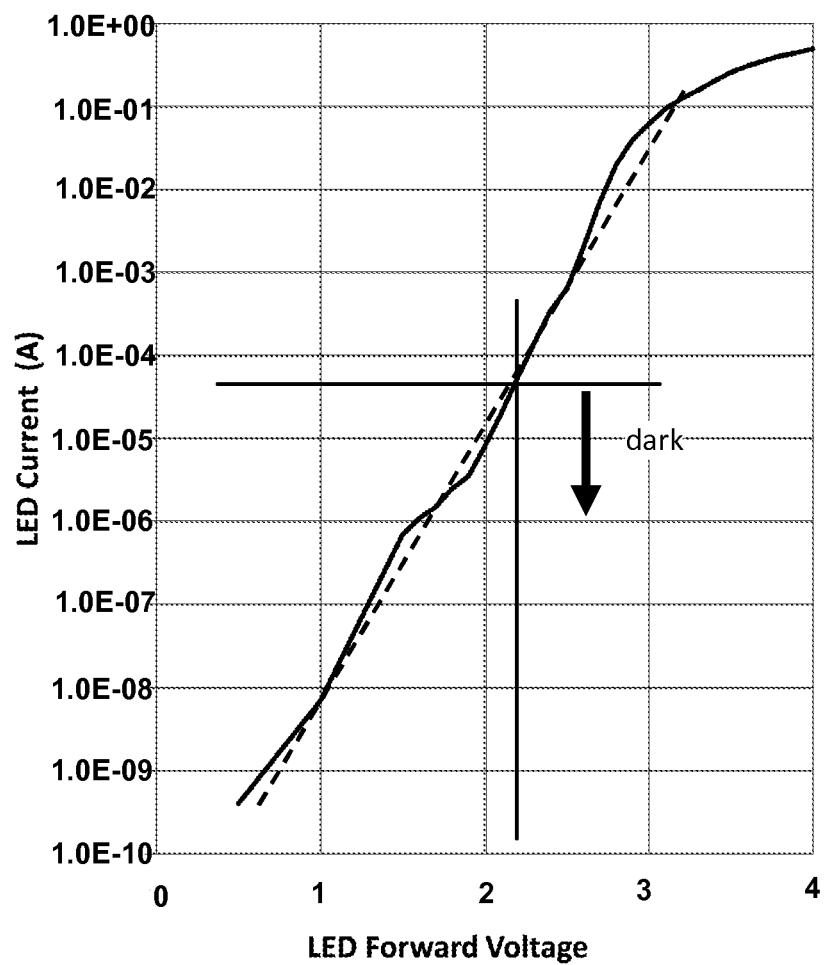
FIG. 4 is a drawing of same I-V characteristics of the HB-LED in FIG. 3 but using a logarithmic scale and highlighting how the visible threshold and current to be sourced by the current source in the SSL system in FIG. 1 may be obtained.

At step 206 the LED current at the visible threshold is either measured or obtained from I-V characteristic data provided by the LED manufacturer. FIG. 3 is a drawing of the I-V characteristics of a commercially available high-brightness LED (HB-LED), which can be used for the LEDs 106 in the SSL system 100. Like any diode, when the forward voltage $V_f$ applied across the LED is greater than the LED's threshold voltage $V_{th}$, a current that is exponentially related to the applied forward voltage flows through the LED. FIG. 4 shows the same I-V characteristics of the HB-LED but using a logarithmic scale, and highlights how the visible threshold and current to be sourced by the current source 108 may be obtained from the LED I-V characteristics. For this exemplary LED, the measured forward voltage at the visible threshold is approximately 2.2 volts and the current that should be sourced by the current source to maintain the LED in a conducting state is seen from the I-V characteristics in FIG. 4 to be approximately 50 µA. (Note that the visible threshold is labeled "dark" with an arrow pointing downward, to indicate that little or no light is observed at LED currents below the visible threshold.)

At step 208 the current source 108 is designed so that it sources a current of the value determined in step 206. Finally, in step 210 the designed current source 108 is attached to the SSL system 100, as shown and described above in reference to FIG. 1.

Figure 5:
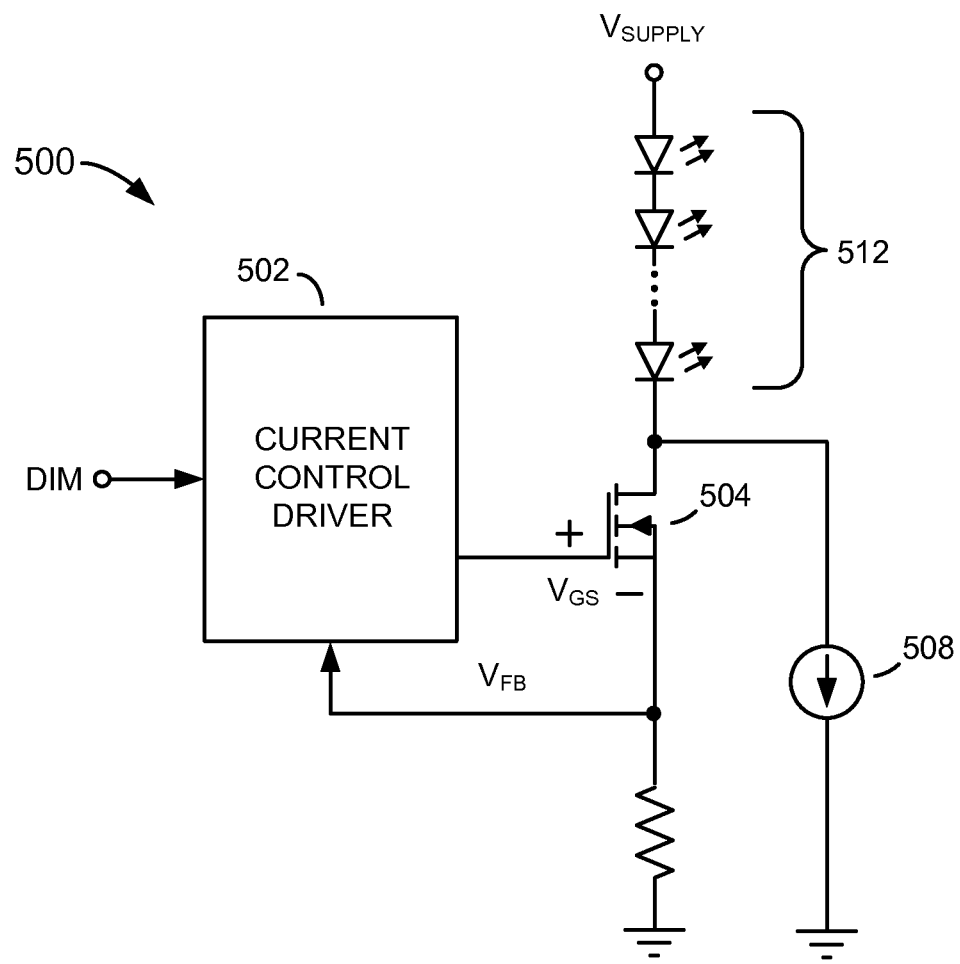
FIG. 5 is a schematic drawing of a solid-state lighting (SSL) system, according to another embodiment of the present invention.

It should be mentioned that the methods and apparatus of the present invention can be employed in SSL systems other than those that employ PWM-based dimming. FIG. 5 illustrates, for example, how the methods and apparatus described above can adapted for use in an SSL system 500 that performs dimming by controlling the magnitude of the gate-to-source voltage $V_{GS}$ applied to a drive MOSFET 504 configured in the current path of the LED string 512. According to this dimming approach, a current control driver 502 operates to control the MOSFET 504 so that it operates in its triode region, where it behaves as a variable resistor, rather than as an ON/OFF switch as in PWM-based dimming. A current source 508 attached to the drain of the MOSFET 504 serves to maintain a minimum current flow through the LED string 512 when the gate-to-source voltage $V_{GS}$ applied to the MOSFET 504 is low, for example, when $V_{GS}$ is near or less than the MOSFET 504 threshold voltage $V_{th}$ or when $V_{GS}=0$, thereby preventing large voltages from the power supply $V_{SUPPLY}$ from dropping across the MOSFET 504.

While various exemplary embodiments of the present invention have been illustrated and described in detail above, those of ordinary skill in the art will appreciate and understand that various changes in form and detail may be made without departing from the true spirit and scope of the invention. The scope of the invention should therefore not be restricted to the specifics of the exemplary embodiments described but instead determined by the words of the appended claims and the full scope of equivalents to which such claims are entitled.

What is claimed is:

1. In a solid-state lighting (SSL) system, a method comprising:
controlling current through an LED or a plurality of LEDs over a range of dimming levels;
measuring a current through said LED or said plurality of LEDs to determine a minimum current that is sufficient to maintain said LED or said plurality of LEDs in a conducting state and that corresponds to a visible threshold at which light emitted by said LED or said plurality of LEDs is not visible to a human eye or is just barely visible to a human eye; and
maintaining the minimum current through said LED or said plurality of LEDs for all dimming levels in said range of dimming levels.

2. In a solid-state lighting (SSL) system, a method comprising:
configuring a light-emitting device (LED) or a plurality of LEDs in a primary current path;
controlling dimming of light emitted by said LED or said plurality of LEDs over a range of dimming levels by controlling current flowing through said primary path, said range of dimming levels including a maximum dimming level and a minimum dimming level;
determining a minimum current that flows or is expected to flow through said LED or said plurality of LEDs when said LED or said plurality of LEDs is controlled to operate at said maximum dimming level; and
maintaining a current corresponding to the determined minimum current through said LED or said plurality of LEDs via a secondary current path during times when current flow through said primary path is interrupted or presents a high resistance to current flow,
wherein determining a minimum current that flows through said LED or plurality of LEDs comprises measuring the minimum current.

3. The method of claim 2, wherein controlling current flowing through said primary path comprises controlling current using pulse-width modulation.

4. The method of claim 2, wherein controlling current flowing through said primary path is performed using a transistor or other active device configured to serve as a variable resistor.

5. In a solid-state lighting (SSL) system, a method comprising:
configuring a light-emitting device (LED) or a plurality of LEDs in a primary current path;
controlling dimming of light emitted by said LED or said plurality of LEDs over a range of dimming levels by controlling current flowing through said primary path, said range of dimming levels including a maximum dimming level and a minimum dimming level;
determining a minimum current that flows or is expected to flow through said LED or said plurality of LEDs when said LED or said plurality of LEDs is controlled to operate at said maximum dimming level; and
maintaining a current corresponding to the determined minimum current through said LED or said plurality of LEDs via a secondary current path during times when current flow through said primary path is interrupted or presents a high resistance to current flow,
wherein determining a minimum current that is expected to flow through said LED or said plurality of LEDs comprise measuring a forward voltage across said LED or measuring one or more forward voltages across one or more LEDs of said plurality of LEDs, and using the measured forward voltage or measured forward voltages to determine said minimum current from current-voltage (I-V) characteristic data of said LED or said plurality of LEDs.

6. The method of claim 5, wherein controlling current flowing through said primary path comprises controlling current using pulse-width modulation.

7. The method of claim 5, wherein controlling current flowing through said primary path is performed using a transistor or other active device configured to serve as a variable resistor.

8. In a solid-state lighting (SSL) system, a method comprising:
- controlling current through an LED or a plurality of LEDs over a range of dimming levels;
- measuring a forward voltage across said LED or forward voltages across one or more LEDs of said plurality of LEDs;
- using the measured forward voltage or measured forward voltages to determine a minimum current from current-voltage (I-V) characteristic data of said LED or said plurality of LEDs, said minimum current being a current that is sufficient to maintain said LED or said plurality of LEDs in a conducting state and that corresponds to a visible threshold at which light emitted by said LED or said plurality of LEDs is not visible to a human eye or is just barely visible to a human eye; and
- maintaining the minimum current through said LED or said plurality of LEDs for all dimming levels in said range of dimming levels.

* * * * *